(12) United States Patent
Singh

(10) Patent No.: US 11,386,145 B2
(45) Date of Patent: Jul. 12, 2022

(54) INCREMENTAL AGGLOMERATIVE CLUSTERING OF DIGITAL IMAGES

(71) Applicant: Adobe Inc., San Jose, CA (US)

(72) Inventor: Damanjit Singh, Rohini (IN)

(73) Assignee: Adobe Inc., San Jose, CA (US)

( * ) Notice: Subject to any disclaimer, the term of this patent is extended or adjusted under 35 U.S.C. 154(b) by 454 days.

(21) Appl. No.: 16/456,670

(22) Filed: Jun. 28, 2019

(65) Prior Publication Data

US 2020/0409988 A1 Dec. 31, 2020

(51) Int. Cl.
| | | |
|---|---|---|
| *G06K 7/00* | (2006.01) | |
| *G06F 16/55* | (2019.01) | |
| *G06F 16/583* | (2019.01) | |
| *G06K 9/62* | (2022.01) | |

(52) U.S. Cl.
CPC ............ *G06F 16/55* (2019.01); *G06F 16/583* (2019.01); *G06K 9/6215* (2013.01); *G06K 9/6219* (2013.01)

(58) Field of Classification Search
None
See application file for complete search history.

(56) References Cited

U.S. PATENT DOCUMENTS

| | | | |
|---|---|---|---|
| 7,941,442 B2 * | 5/2011 | Li | G06F 16/5838 |
| | | | 707/780 |
| 8,363,961 B1 | 1/2013 | Avidan et al. | |
| 2016/0063611 A1 * | 3/2016 | Davis | G06Q 30/0639 |
| | | | 705/26.63 |

OTHER PUBLICATIONS

Daxin Jiang. Cluster Analysis for Gene Expression Data: A Survey. IEEE Transactions on Knowledge and Data Engineering, vol. 16, No. 11, Nov. 2004. pp. 1370-1386 (Year: 2004).*

* cited by examiner

*Primary Examiner* — Tuankhanh D Phan
(74) *Attorney, Agent, or Firm* — Finch & Maloney PLLC

(57) ABSTRACT

Techniques are disclosed for incremental agglomerative clustering of data, including but not limited to digital image data. Fewer than all of a plurality of existing digital image fingerprints are sampled from a first hierarchical data cluster of digital image fingerprints stored in a data storage device, the first hierarchical data cluster excluding a new digital image fingerprint. The new digital image fingerprint and the existing digital image fingerprints sampled from the first hierarchical data cluster are clustered to produce a second hierarchical data cluster of digital image fingerprints, the second hierarchical data cluster including the new digital image fingerprint. If a majority of the existing digital image fingerprints in the first hierarchical data cluster match the new digital image fingerprint, then the second hierarchical data cluster is mapped to the first hierarchical data cluster based on the determination.

17 Claims, 7 Drawing Sheets

US 11,386,145 B2

INCREMENTAL AGGLOMERATIVE CLUSTERING OF DIGITAL IMAGES

FIELD OF THE DISCLOSURE

This disclosure relates generally to the field of digital image processing, and more particularly, to techniques for incremental agglomerative clustering of data.

BACKGROUND

Searching a high-dimensional data set is a complex problem. High-dimensional data includes information that can be represented by a large number of features or attributes. For example, in the context of digital image processing, an image of a three-dimensional object can be defined by a set of coordinates representing locations of surfaces of the object within a three-dimensional coordinate space. The object may have many such surfaces, increasing the amount of the data representing the object. Furthermore, each surface can have additional attributes such as color, transparency, reflectivity, or other image properties that further increase the size of the data set. Thus, a full description of the properties of the object can include many data points within a high-dimensional feature space. Data clustering techniques can be utilized to organize and group the data such that objects in the same group are more similar to each other than objects in other groups with respect to their properties and attributes. However, clustering high-dimensional data is a time- and computationally-expensive process, which can be a disadvantage when new data is regularly generated, such as when new images are added to the data set. Therefore, complex and non-trivial issues associated with data organization remain due to the limitations of these existing techniques.

BRIEF DESCRIPTION OF THE DRAWINGS

The accompanying drawings are not intended to be drawn to scale.

DETAILED DESCRIPTION

Figure 1:
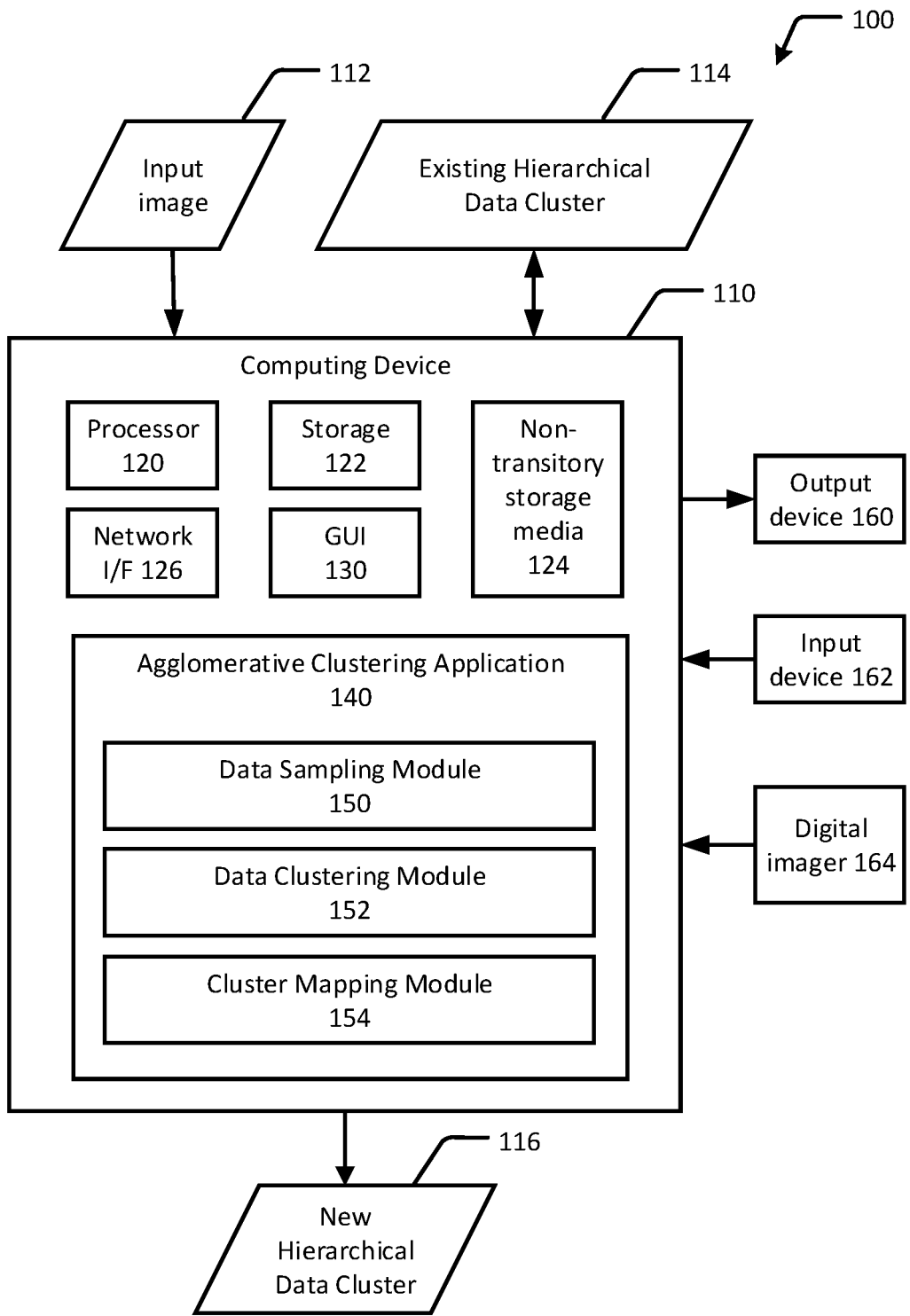
FIG. 1 shows an example system for incremental agglomerative clustering of data, in accordance with an embodiment of the present disclosure.

Techniques are disclosed for incremental agglomerative clustering of data, including but not limited to digital image data. Samples of previously clustered data are clustered with new data resulting in a new set of clusters. Each cluster is assigned a group identification value representing the features of the objects in the clustered data. If a group identification value of an existing cluster matches or is similar to (within a threshold difference) a group identification value of the newly clustered data, then the new cluster is mapped to the existing cluster and effectively becomes a member of the existing cluster. Otherwise, the new clusters, which include the new data and the sampled data, are added to the data set. In this manner, it is not necessary to re-cluster all existing data when new data is generated, and new data can be added to existing clusters more quickly and at lower computational expense as compared to existing clustering techniques. For purposes of explanation, digital image processing is used as an example application of the disclosed techniques. However, the disclosed techniques are not limited to image processing, and may be used in any suitable application context on any suitable type of data set (e.g., audio data, video data, seismic data, statistical data, etc.).

In the field of digital imaging, for instance, it is common to categorize images according to objects in those images. For example, within a group of images of people, the images can be categorized according to the faces of the people so that the images can be quickly referenced and located. Several existing techniques can be used for categorizing digital images and data in general.

Hierarchical Agglomerative Clustering (HAC) is a technique for categorizing data, particularly when the data are well-identified. HAC is a type of hierarchical clustering used to group objects in clusters based on their similarity. For example, two or more digital images can be compared based on their digital fingerprints. A digital fingerprint—sometimes referred to as an image hash—is an identifier that uniquely identifies an image based on the contents of the image. The similarity between digital images can be determined, for example, by comparing a distance between their respective fingerprints using a distance function, as will be understood by one of skill in the art. For example, a distance function, or metric, can define a distance between pairs of elements in a set of data, such as pairs of digital images or pairs of digital image fingerprints. Data objects that are relatively close to each other (in terms of the distance between the objects) are more similar than data objects that are relatively far away from each other.

The HAC algorithm starts by treating each object in the data, such as a single digital image, as a singleton cluster. Next, the similarity (or dissimilarity) of the information between pairs of objects in the data set, such as two digital images, is computed based on the distance between the objects. A cluster of digital images includes a subset of the objects, where the distance between objects in the subset is less than a maximum distance needed to connect the objects together in the cluster. The maximum distance is a function of the similarity. For example, the lower the maximum distance between objects, the more similar the objects in the cluster will be. Likewise, the higher the maximum distance between objects, the less similar the objects in the cluster will be. Once the singleton clusters have been combined into new clusters, these clusters of objects are successively merged in pairs in a similar manner until only one cluster remains, resulting in a tree-like map representing each step of the mergers.

HAC is time- and computationally-expensive to perform every time new data are added. For instance, a brute force solution to adding new objects to the data set is to re-cluster all existing with the new data to get a new set of results. As such, brute-force HAC is not practical for use in a production environment of millions of objects where new objects are regularly added because the time and computational power needed to re-cluster all the existing data with the new data becomes ever increasing. One way to reduce the computational load of HAC is to incrementally cluster newly added data into existing clusters. Even so, it remains difficult to incrementally cluster new data into large amounts of existing data efficiently using existing techniques.

To this end, the disclosed techniques provide novel methods of achieving fast, efficient, and incremental hierarchical agglomerative clustering. An example method includes receiving new input data, such as new images of faces, and taking samples from existing clustered image data. The new input data is clustered along with the samples of existing data using HAC to create a new set of clusters. The sample size can be, for example, 20 data points from the existing cluster. The new clusters are then mapped to the existing clusters, where possible, based on the following logic. First, within each new cluster, an element (e.g., a face) representing a majority of elements (if any) in the cluster is assigned the same group ID as the group ID of an existing cluster having the same majority of elements. Next, all elements of the new cluster are mapped back to the majority group ID. If there is no majority or if a cluster is already assigned to this majority group ID, then this cluster is not assigned to any majority group ID. Instead, the new cluster is added to the existing set of clusters. As a result, in some cases the disclosed algorithm clusters up to one-third fewer data points than brute-force clustering techniques when a new data point is added to the data set, depending upon the chosen sample size and other parameters.

In some circumstances, the results from the disclosed algorithm are functionally equivalent to the results of regular, brute-force agglomerative clustering and improve with each run as the new data is added to the data set. Thus, this solution is very well suited for flowing data, where the objective is to cluster the in flowing data on a continuous basis.

System Overview

FIG. 1 shows an example system 100 for incremental agglomerative clustering of data, in accordance with an embodiment of the present disclosure. The system 100 includes a computing device 110 having a processor 120, a storage 122, one or more non-transitory storage media 124, a network interface 126, a graphical user interface (GUI) 130, and an Agglomerative Clustering Application 140. The GUI 130 includes a display and user input device.

In some embodiments, processor 120 of the computing device 110 is configured to execute one or more of the following modules, each of which is described in further detail below: Data Sampling Module 150, Data Clustering Module 152, and Clustering Mapping Module 154. The computing device 110 is further configured to receive, as inputs, at least one digital image 112 (for example, an image of a person's face), and an existing hierarchical data cluster 114. The existing hierarchical data cluster 114 provides, to the computing device 110, digital images and, in some cases, fingerprints of the digital images that have previously been received, processed and stored in a data storage device. Each image 112 represents a digital image of a person or object to be processed by the system 100. Although this disclosure discusses the processing of digital images, it will be understood that the disclosed techniques can be applied to any type of data, such as document data or other types of data that can be classified or categorized in any manner. Such classification facilitates grouping, or clustering, the data in a way that makes the data more easily searchable and retrievable, particularly when large amounts of data are stored on the storage device.

The computing device 110 is further configured to produce a new hierarchical data cluster 116 that is based at least in part on the input image 112 and the existing hierarchical data cluster 114. The new hierarchical data cluster 116 can, for example, include a digital image fingerprint of the input image 112, such as variously described in this disclosure. Any number of standard or proprietary digital images (e.g., JPEG, bitmap, PNG, TIFF, QuickTime VR, and PANO) can be used for the input images 112. Each of the modules 150, 152, and 154 can be used in conjunction with each other for agglomerative clustering, with the process producing the new hierarchical data cluster 116 or other data associated with the input image 112, such as data representing images similar to the input image 112 or data representing the content of the input image 112, such as data that uniquely identifies the face(s) of people appearing in the image(s).

As used in this disclosure, a digital image fingerprint can include any value that uniquely identifies the contents of an image. For example, two identical images will have the same digital image fingerprint, while two similar but not identical images will have similar but not identical image fingerprints. A difference hash, such as a dHash algorithm, is a perceptual hash that produces a fingerprint of an image based on the features in the image. The fingerprint can, for example, include a vector of 2048 floating point numbers, which represent certain features of the face. A cosine or Euclidian similarity measure can be used to compare two face vectors. In another example, the difference hash can be generated, for example, by converting an image to grayscale, downsizing the image (for instance, to a nine pixel-by-nine pixel thumbnail), and calculating a 64-bit row hash and a 64-bit column hash, which in combination provide a 128-bit hash value. The row hash is either one or zero depending on whether the pixel intensity increases or decreases along an x-axis of the image, and the column hash is calculated similarly along a y-axis of the image. If the linear (algebraic) difference between the difference hashes of two images is relatively small (for example, less than a threshold value), then the two images are considered to be similar for clustering together. Likewise, if the difference between the difference hashes of two images is relatively large (for example, greater than a threshold value), then the two images are considered to be distinct and not clustered together. It will be understood that difference hashes are one example of a digital image fingerprint that can be implemented in conjunction with the disclosed techniques. In some embodiments, other suitable types of digital image fingerprint techniques can be used to uniquely identify images. For example, a Hamming distance can be used to calculate the number of bits in a hash of one image that are different from a hash of another image. The greater the number of different bits in the hashes, the more different the images are in comparison with each other. In some cases, k-dimensional (k-d) trees or vantage-point (VP) trees can be used to reduce the complexity of the image fingerprint comparison from linear to sub-linear, as will be understood by one of skill.

The computing device 110 can be any computer system, such as a workstation, desktop computer, server, laptop, handheld computer, tablet computer (e.g., the iPad® tablet computer), mobile computing or communication device (e.g., the iPhone® mobile communication device, the Android™ mobile communication device, and the like), VR device or VR component (e.g., headset, hand glove, camera, treadmill, etc.) or other form of computing or telecommunications device that is capable of communication and that has sufficient processor power and memory capacity to perform the operations described in this disclosure. A distributed computational system can be provided including a plurality of such computing devices.

The computing device 110 includes one or more storage devices 122 or non-transitory computer-readable media 124 having encoded thereon one or more computer-executable instructions or software for implementing techniques as variously described in this disclosure. The storage devices 122 can include a computer system memory or random access memory, such as a durable disk storage (which can include any suitable optical or magnetic durable storage device, e.g., RAM, ROM, Flash, USB drive, or other semiconductor-based storage medium), a hard-drive, CD-ROM, or other computer readable media, for storing data and computer-readable instructions or software that implement various embodiments as taught in this disclosure. The storage device 122 can include other types of memory as well, or combinations thereof. The storage device 122 can be provided on the computing device 110 or provided separately or remotely from the computing device 110. The non-transitory computer-readable media 124 can include, but are not limited to, one or more types of hardware memory, non-transitory tangible media (for example, one or more magnetic storage disks, one or more optical disks, one or more USB flash drives), and the like. The non-transitory computer-readable media 124 included in the computing device 110 can store computer-readable and computer-executable instructions or software for implementing various embodiments. The computer-readable media 124 can be provided on the computing device 110 or provided separately or remotely from the computing device 110.

The computing device 110 also includes at least one processor 120 for executing computer-readable and computer-executable instructions or software stored in the storage device 122 or non-transitory computer-readable media 124 and other programs for controlling system hardware. Virtualization can be employed in the computing device 110 so that infrastructure and resources in the computing device 110 can be shared dynamically. For example, a virtual machine can be provided to handle a process running on multiple processors so that the process appears to be using only one computing resource rather than multiple computing resources. Multiple virtual machines can also be used with one processor. Network interface (I/F) 126 can be any appropriate network chip or chipset which allows for wired or wireless connection between the device 110 and a communication network (not shown) and other computing devices and resources.

A user can interact with the computing device 110 through an output device 160, such as a screen or monitor, which can display one or more user interfaces or images, including the input image 112 and images stored in the existing hierarchical data cluster 114 and the new hierarchical data cluster 116, as provided in accordance with some embodiments. The output device 160 can also display other aspects, elements or information or data associated with some embodiments. The computing device 110 can include input or input/output devices 162 for receiving input from a user, for example, a keyboard, a joystick, a game controller, a pointing device (e.g., a mouse, a user's finger interfacing directly with a touch-sensitive display device, etc.), or any suitable user interface, including an AR headset. The computing device 110 can further include a digital imager 164 configured to acquire the input image 112, although it will be understood that the input image 112 can be acquired from another source, such as a separate storage device or a network interface to another imaging device. The digital imager 164 can be a digital camera, digital document scanner, or other device configured to acquire the image 112. The computing device 110 can include other suitable conventional I/O peripherals. The computing device 110 includes or is operatively coupled to various suitable devices for performing one or more of the techniques as variously described in this disclosure.

The computing device 110 can run any operating system, such as any of the versions of Microsoft® Windows® operating systems, the different releases of the Unix® and Linux® operating systems, any version of the MacOS® for Macintosh computers, any embedded operating system, any real-time operating system, any open source operating system, any proprietary operating system, any operating systems for mobile computing devices, or any other operating system capable of running on the computing device 110 and performing the operations described in this disclosure. In an embodiment, the operating system can be run on one or more cloud machine instances.

In other embodiments, the functional components/modules can be implemented with hardware, such as gate level logic (e.g., FPGA) or a purpose-built semiconductor (e.g., ASIC). Still other embodiments can be implemented with a microcontroller having several input/output ports for receiving and outputting data, and several embedded routines for carrying out the functionality described in this disclosure. In a more general sense, any suitable combination of hardware, software, and firmware can be used, as will be apparent.

As will be appreciated in light of this disclosure, the various modules and components of the system, such as the modules 150, 152, 154, the GUI 140, or any combination of these, is implemented in software, such as a set of instructions (e.g., HTML, XML, C, C++, object-oriented C, JavaScript®, Java®, BASIC, etc.) encoded on any computer readable medium or computer program product (e.g., hard drive, server, disc, or other suitable non-transitory memory or set of memories), that when executed by one or more processors, cause the various methodologies provided in this disclosure to be carried out. It will be appreciated that, in some embodiments, various functions and data transformations performed by the user computing system, as described in this disclosure, can be performed by similar processors or databases in different configurations and arrangements, and that the depicted embodiments are not intended to be limiting. Various components of this example embodiment, including the computing device 100, can be integrated into, for example, one or more desktop or laptop computers, workstations, tablets, smart phones, game consoles, set-top boxes, or other such computing devices. Other componentry and modules typical of a computing system, such as processors (e.g., central processing unit and co-processor, graphics processor, etc.), input devices (e.g., keyboard, mouse, touch pad, touch screen, etc.), and operating system, are not shown but will be apparent.

As will be described in further detail below, the Data Sampling Module 150 can be configured to obtain all or some of the data from the existing hierarchical data cluster 114. The sampled data is used in conjunction with the input image 112 to generate one or more new hierarchical data clusters for adding the input image 112 to the existing data set (corpus) of images. The Data Clustering Module 152 can be configured to cluster the new input image 112 along with the samples of existing data using HAC to create a new set of clusters 116. The Cluster Mapping Module 154 can be configured to map the new clusters to the existing clusters, where appropriate. For example, if the new clusters, which include the input image 112 or a digital fingerprint of the image as well as images or digital fingerprints sampled from the existing clusters, are sufficiently similar to any existing clusters, then the new clusters are mapped to the existing clusters. In this manner, the disclosed techniques facilitate incremental clustering of new data into large amounts of existing data more efficiently than by using brute-force HAC algorithms because only limited samples of existing data are re-clustered, rather than clustering all existing data with the new data.

Clustering Overview

Figure 2:
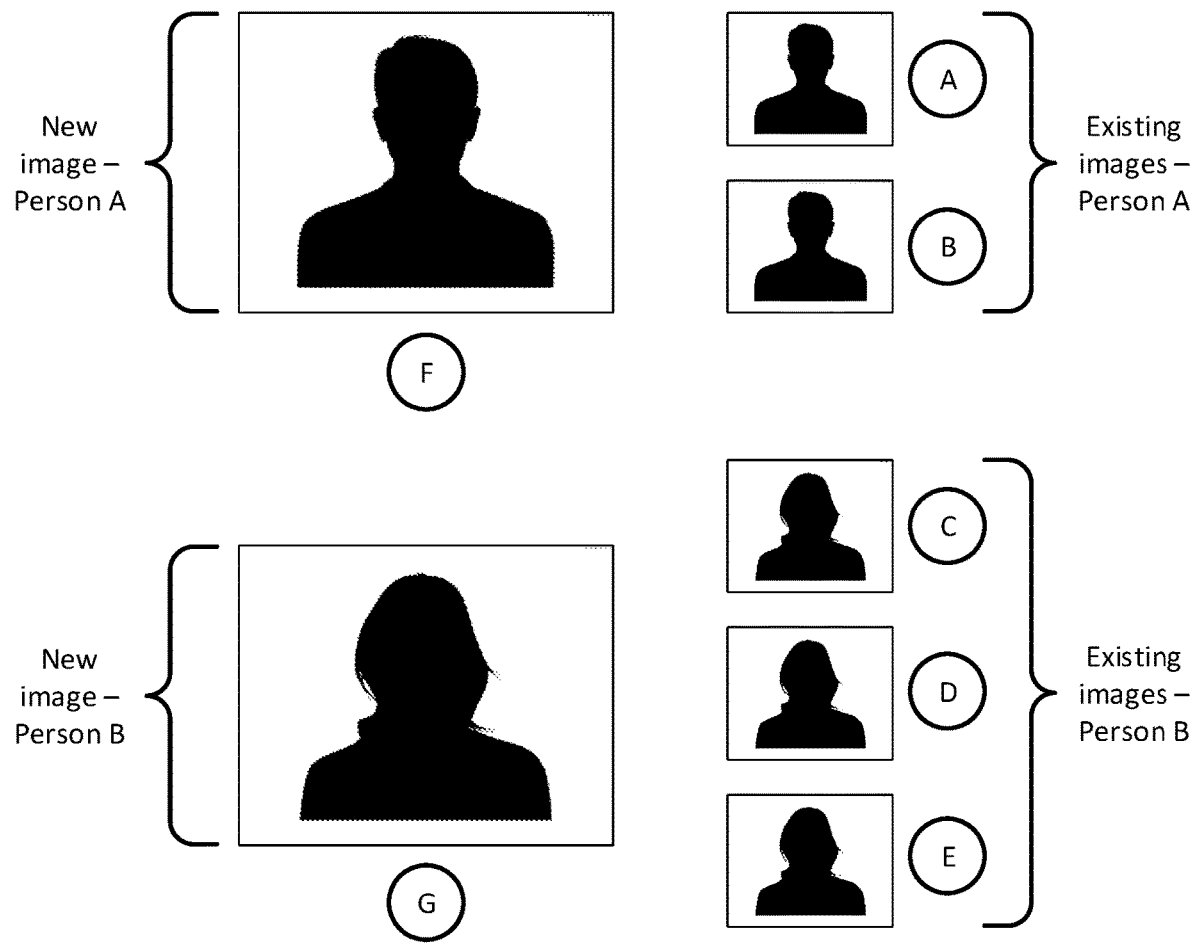
FIG. 2 are example images for demonstrating the disclosed incremental agglomerative clustering techniques, in accordance with various embodiments.
Figure 3:
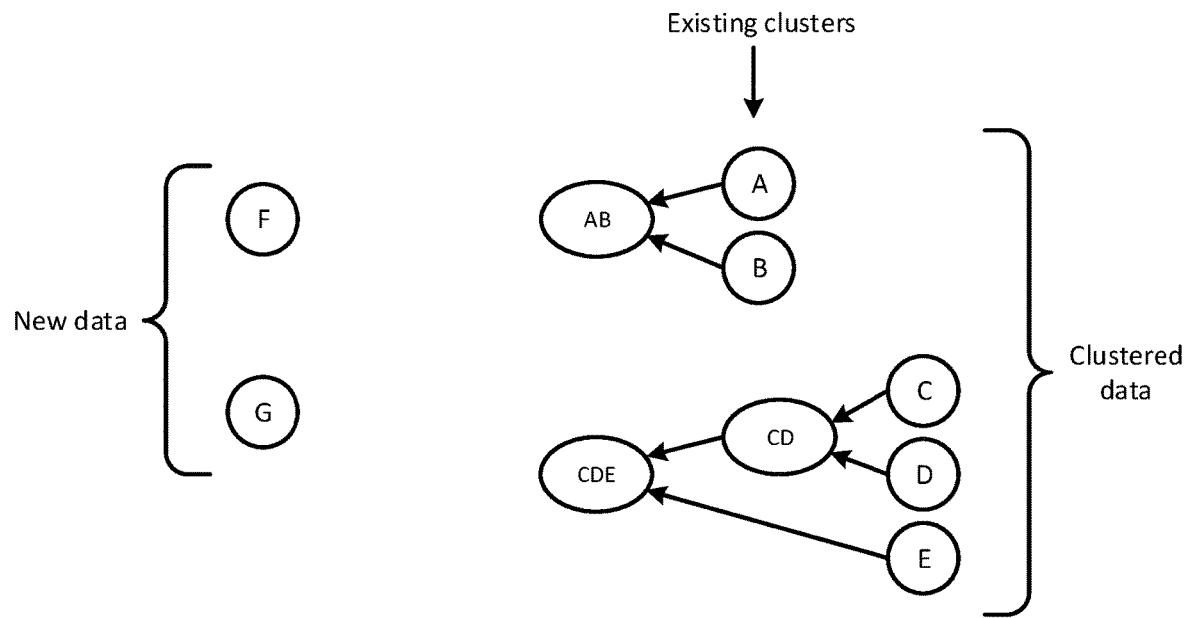
FIG. 3 shows an example dendrogram of a hierarchical data cluster of the images of FIG. 2, in accordance with an embodiment.
Figure 4:
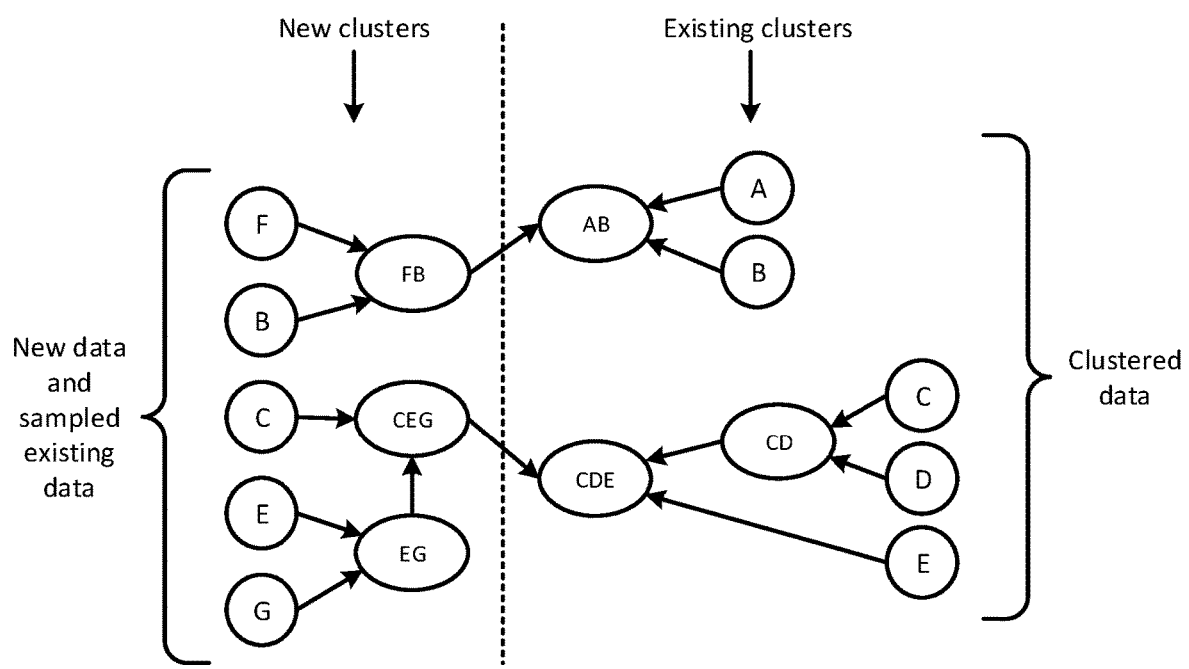
FIG. 4 shows an example dendrogram of another hierarchical data cluster of the images of FIG. 2, in accordance with an embodiment.

FIGS. 2, 3 and 4 show an example demonstrating the disclosed incremental agglomerative clustering techniques, in accordance with various embodiments. FIG. 2 shows several images of two people, referred to here as Person A and Person B, in accordance with an embodiment. The images of Person A are referenced in FIG. 2 as images A, B, and F, and the images of Person B are referenced as images C, D, E, and G. In this example, images A, B, C, D, and E are existing images of Person A and Person B, respectively, and images F and G are new images of Person A and Person B, respectively. In this context, an existing image is one that has previously been acquired, clustered, and stored in the data set, while a new image is one that has not yet been clustered or stored. Note that each of the images can be different even if there are multiple images of the same person's face. For clarity, a limited number of images are discussed in this example, although it will be understood that the disclosed techniques can be applied to and used in conjunction with any number of images, such as dozens, hundreds, thousands, or millions of images. Furthermore, the disclosed techniques can be applied to any type of classifiable data, such as digital images of objects, digitized documents, and so forth.

FIG. 3 shows an example dendrogram of a hierarchical data cluster of the images of FIG. 2 prior to clustering new images F and G, in accordance with an embodiment. Each of the data clusters can contain various types of information, including digital image data and digital image fingerprint data. Images F and G represent new images of Person A and Person B, respectively, and are not yet clustered with any other data. Images A, B, C, D, and E represent existing images of Person A and Person B, respectively, and have previously been clustered as follows: Images A and B are included in cluster AB, images C and D are included in cluster CD, and images C, D, and E are included in cluster CDE. The clusters AB, CD, and CDE are considered existing data clusters as they were generated prior to processing of the new images F and G. The arrows between the existing data clusters, including the singleton clusters A, B, C, D, and E, represent the existing mappings between those clusters.

FIG. 4 shows an example dendrogram of another hierarchical data cluster of the images of FIG. 2 subsequent to clustering new images F and G, in accordance with an embodiment. As discussed with respect to FIG. 3, each of the data clusters can contain various types of information, including digital image data and digital image fingerprint data. As noted above, images F and G represent new images of Person A and Person B, respectively. In addition to the existing clusters AB, CD, and CDE, FIG. 4 shows new clusters as follows: Images F and B are included in cluster FB, images E and G are included in cluster EG, and images C, E, and G are included in cluster CEG. The new clusters are generated using the new images F and G along with samples of existing images A, B, C, D, and E. In this example, the sampled images are fewer than all existing images and include images B, C, and E. The arrows between the clusters, including the singleton clusters A, B, C, D, E, F, and G, represent the mappings between the clusters. As can be seen, new clusters FB, CEG, and EG are mapped to existing clusters AB and CDE. In this manner, the new images F and G can be mapped to the existing clusters AB and CDE, respectively, using a sample of the existing images (fewer than all of the existing images) and without having to re-cluster all of the existing images.

In a more general example, the number of images, the number of clusters, and the number of samples can be greater than that shown in FIGS. 2, 3, and 4, on the order of dozens, hundreds, thousands, millions, or more. In some embodiments, the number of sample images taken from the set of existing images is approximately 20, although more or fewer samples can be used. If each image contains one person's face, then the number of sample faces is approximately 20. However, if at least some of the images contain more than one person's face, then the number of sample faces is more than approximately 20. For instance, if there are approximately 80 faces among the approximately 20 images, then the number of faces in the sampled images is approximately 80, even though some (or all) of the faces may be of the same person. By comparison, there may be hundreds or thousands of faces in all existing images. Thus, by taking a relatively small sample of the existing images, there are fewer images to process using the disclosed incremental agglomerative clustering techniques, thus improving clustering speed and efficiency when new images are added to the data set.

Example Methods

Figure 5:
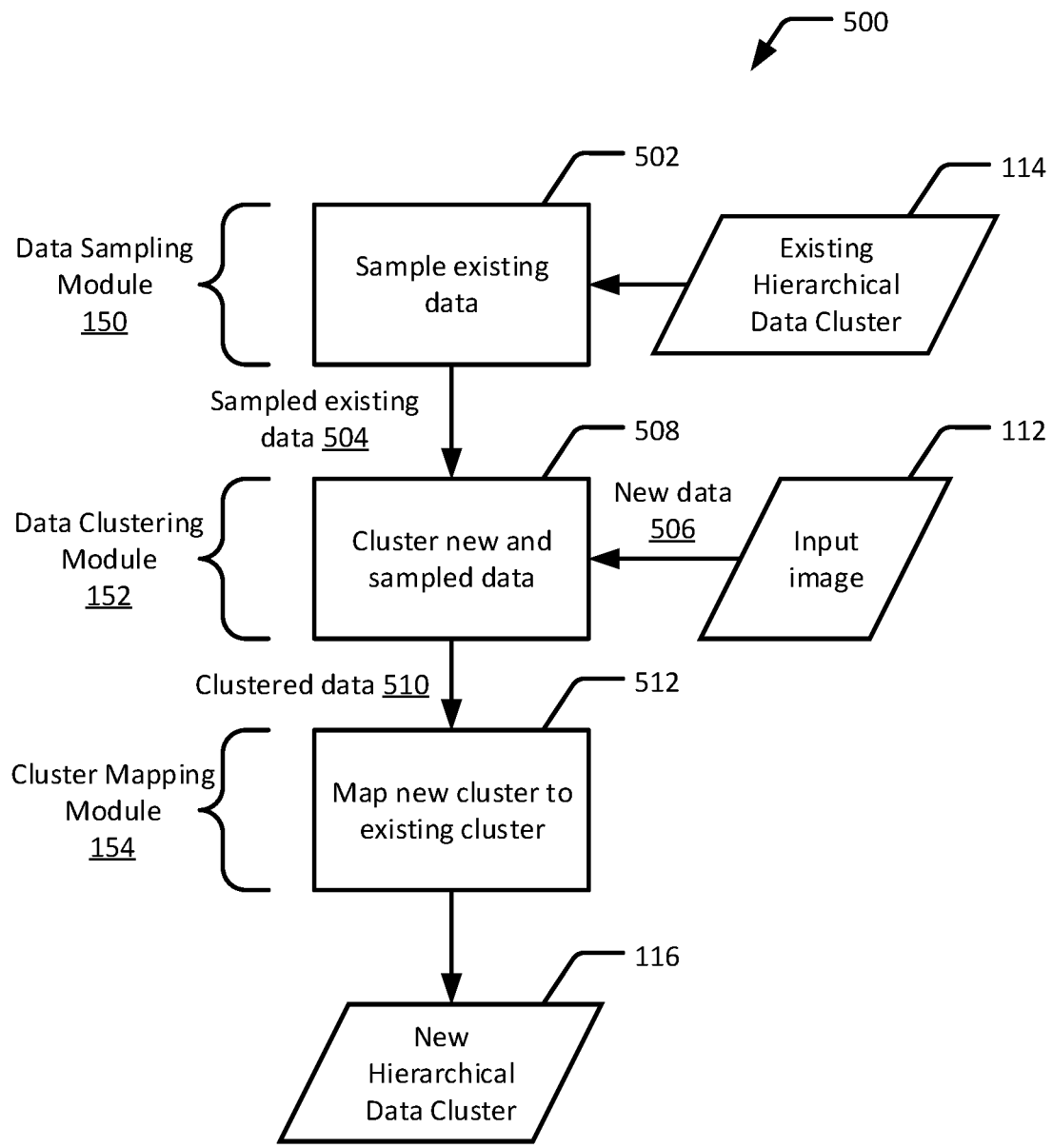
FIG. 5 is an example flow diagram of a method of incremental agglomerative clustering of data, in accordance with an embodiment.

FIG. 5 is an example flow diagram of a method 500 of incremental agglomerative clustering of data, in accordance with an embodiment. The method 500 can be implemented, for example, in the Agglomerative Clustering Application 140 of FIG. 1 and performed by the system 100. The method 500 includes sampling 502 existing data, such as digital images or digital image fingerprints, from the existing hierarchical data cluster 114 to produce sampled existing data 504. The sampling 502 can be implemented, for example, in the Data Sampling Module 150 of FIG. 1 and performed by the system 100. The existing hierarchical data cluster can, for example, be similar to the existing data cluster discussed with respect to FIGS. 3 and 4 in that it includes digital image data and/or digital image fingerprint data of images that have previously been clustered but excluding digital image data and/or digital image fingerprint data of new images that have not yet been clustered. For example, in some embodiments, the sampling 502 includes sampling fewer than all existing digital image fingerprints from a first hierarchical data cluster of digital image fingerprints stored in a data storage device, the first hierarchical data cluster excluding a new digital image fingerprint.

The method 500 further includes clustering 508 the sampled existing data 504 and new data 506 (e.g., data representing the input image 112) using, for example, a HAC algorithm or other suitable clustering algorithm to produce clustered data 510. The clustering 508 can be implemented, for example, in the Data Clustering Module 152 of FIG. 1 and performed by the system 100. The clustered data 510 includes both the new data as well as some of the existing data, but not all of the existing data, such as discussed with respect to FIG. 4. For example, in some embodiments, the clustering 508 includes clustering the new digital image fingerprint and each of the existing digital image fingerprints sampled from the first hierarchical data cluster to produce a second hierarchical data cluster of digital image fingerprints, the second hierarchical data cluster including the new digital image fingerprint.

The method 500 further includes mapping 512 the new clustered data 510 to the existing clustered data 114 to produce a new hierarchical data cluster 116, such as discussed with respect to FIG. 4. The mapping 512 can be implemented, for example, in the Cluster Mapping Module 154 of FIG. 1 and performed by the system 100. As shown in FIG. 4, the mapping represents a relation between clusters in the hierarchical data cluster where the distance between clusters is less than a maximum distance used to determine the similarity between objects in the clusters. For example, the mapping between clusters FB and AB is generated if the distance between clusters FB and AB is less than a maximum distance for relating the faces F and B to faces A and B in the respective clusters. This mapping between clusters FB and AB is generated because both clusters include images of the face of Person B.

Figure 6:
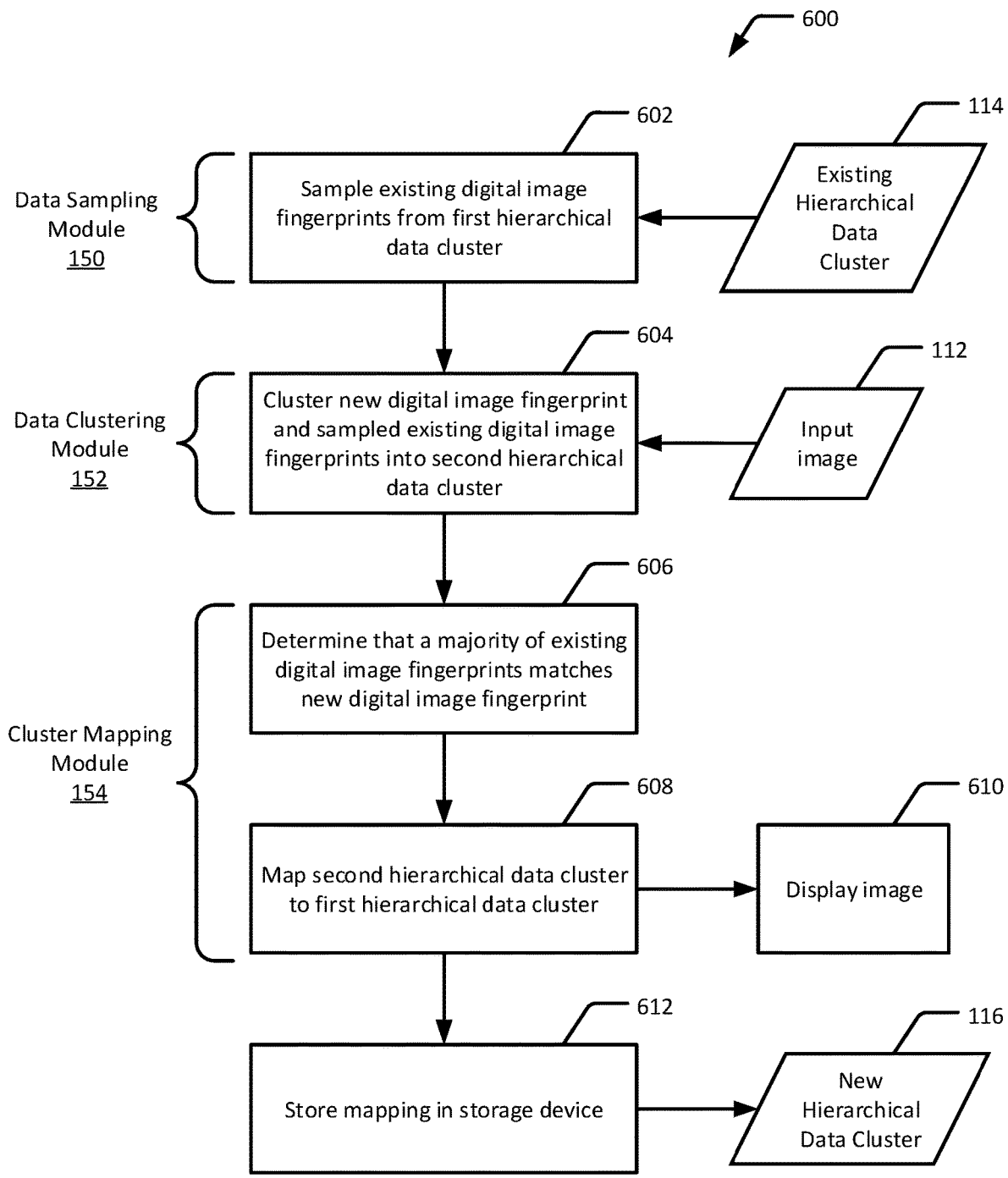
FIG. 6 is another example flow diagram of a method of incremental agglomerative clustering of data, in accordance with an embodiment.

FIG. 6 is another example flow diagram of a method 600 of incremental agglomerative clustering of data, in accordance with an embodiment. The method 600 can be implemented, for example, in the Agglomerative Clustering Application 140 of FIG. 1 and performed by the system 100. The method 600 includes sampling 602 fewer than all existing digital image fingerprints from a first hierarchical data cluster 114 of digital image fingerprints stored in a data storage device. The sampling 602 can be implemented, for example, in the Data Sampling Module 150 of FIG. 1 and performed by the system 100. The first hierarchical data cluster 114 excludes a new digital image fingerprint. In other words, the first hierarchical data cluster includes digital image fingerprints that have previously been clustered (and thus are considered existing), but not any digital image fingerprints that have not yet been clustered. In this embodiment, fewer than all existing digital image fingerprints are sampled. For example, a sample of 20 digital image fingerprints are sampled from a much larger set of fingerprints, on the order of approximately one sample for every 25 or more fingerprints or other data points in the first hierarchical data cluster.

In some embodiments, the method 600 includes receiving the new digital image and computing the new digital image fingerprint based on the new digital image if the fingerprint is not available. The method 600 further includes clustering 604 the new digital image fingerprint and each of the existing digital image fingerprints sampled from the first hierarchical data cluster to produce a second hierarchical data cluster of digital image fingerprints, the second hierarchical data cluster including the new digital image fingerprint. The clustering 604 can be implemented, for example, in the Data Clustering Module 152 of FIG. 1 and performed by the system 100. Various clustering techniques can be used, including HAC techniques. Notably, in this embodiment, only the new digital image fingerprint and the existing digital image fingerprints that were sampled from the first hierarchical data cluster are clustered. In other words, because the sample size is less than the total number of existing data points, not all existing digital image fingerprints in the first hierarchical data cluster are re-clustered. This facilitates an improvement in speed and efficiency when the new digital image fingerprint is added to the existing data clusters. In some embodiments, the clustering 604 includes determining a similarity between each of the existing digital image fingerprints sampled from the hierarchical data cluster and the new digital image fingerprint using a distance function. For example, the degree of similarity determines whether two or more digital images of a person's face or two or more digital image fingerprints are sufficiently likely to include images of the face of the same person.

The method 600 further includes determining 606 that a majority of the existing digital image fingerprints in the first hierarchical data cluster match the new digital image fingerprint. The fingerprints are considered to match when a distance metric is applied to the fingerprints and the distance between the fingerprints falls within or below a threshold distance, or when the fingerprints are the same. The threshold distance and the measurement unit depend on how the fingerprint is computed (e.g., a hash), and in some cases the distance can be a unitless value or a binary value. The method 600 further includes mapping 608 the second hierarchical data cluster to the first hierarchical data cluster based on the determination. The determining 606 and mapping 608 can each be implemented, for example, in the Cluster Mapping Module 154 of FIG. 1 and performed by the system 100. For example, the second hierarchical data cluster is mapped to the first hierarchical data cluster only if a majority of the existing digital image fingerprints in the first hierarchical data cluster match the new digital image fingerprint. Otherwise, the mapping is not performed. Instead, the second hierarchical data cluster is added to the overall set of data clusters as a new cluster.

In some embodiments, the first hierarchical data cluster includes a plurality of different hierarchical data clusters. For example, as described with respect to FIGS. 3 and 4, one data cluster may include digital image data and/or digital image fingerprint data for Person A and another data cluster may include digital image data and/or digital image fingerprint data for Person B. In such embodiments, the determining 606 that a majority of the existing digital image fingerprints in the first hierarchical data cluster match the new digital image fingerprint includes determining which one of the different hierarchical data clusters includes the majority of the existing digital image fingerprints that match the new digital image fingerprint. The mapping 608 in such embodiments includes mapping the second hierarchical data cluster to the one of the different hierarchical data clusters that includes the majority of the existing digital image fingerprints that match the new digital image fingerprint. For example, referring to FIG. 4, there are two such mappings: one mapping between clusters FB (second) and AB (first), and another mapping between clusters CEG (second) and CDE (first).

The method 600 further includes storing 612 the mapping in the data storage device. For example, the mappings shown in FIG. 4 can be stored along with the data cluster set for future retrieval and use. In some embodiments, the method 600 further includes comprising storing the second hierarchical data cluster in the data storage device.

In some embodiments, the method 600 includes displaying 610, via a display device, at least one digital image corresponding to one of the existing digital image fingerprints in the first hierarchical data cluster in response to the mapping. For example, once the new input image 112 has been clustered and mapped, the image 112 can be displayed to a user. Other images associated with the cluster(s) mapped to the input image 112 can also be displayed to the user, such as images A, B, C, D, E, F, and/or G as shown in FIG. 2.

In some embodiments, the method 600 includes determining a first group identification value associated with the first hierarchical data cluster of digital image fingerprints and a second group identification value associated with the second hierarchical data cluster of digital image fingerprints.

In this context, a group identification value is a value that uniquely identifies the respective data cluster. Thus, two data clusters containing different data will have two or more unique identification values. In such embodiments, the determining 606 that a majority of the existing digital image fingerprints in the first hierarchical data cluster match the new digital image fingerprint includes determining that the first group identification value matches the second group identification value.

Figure 7:
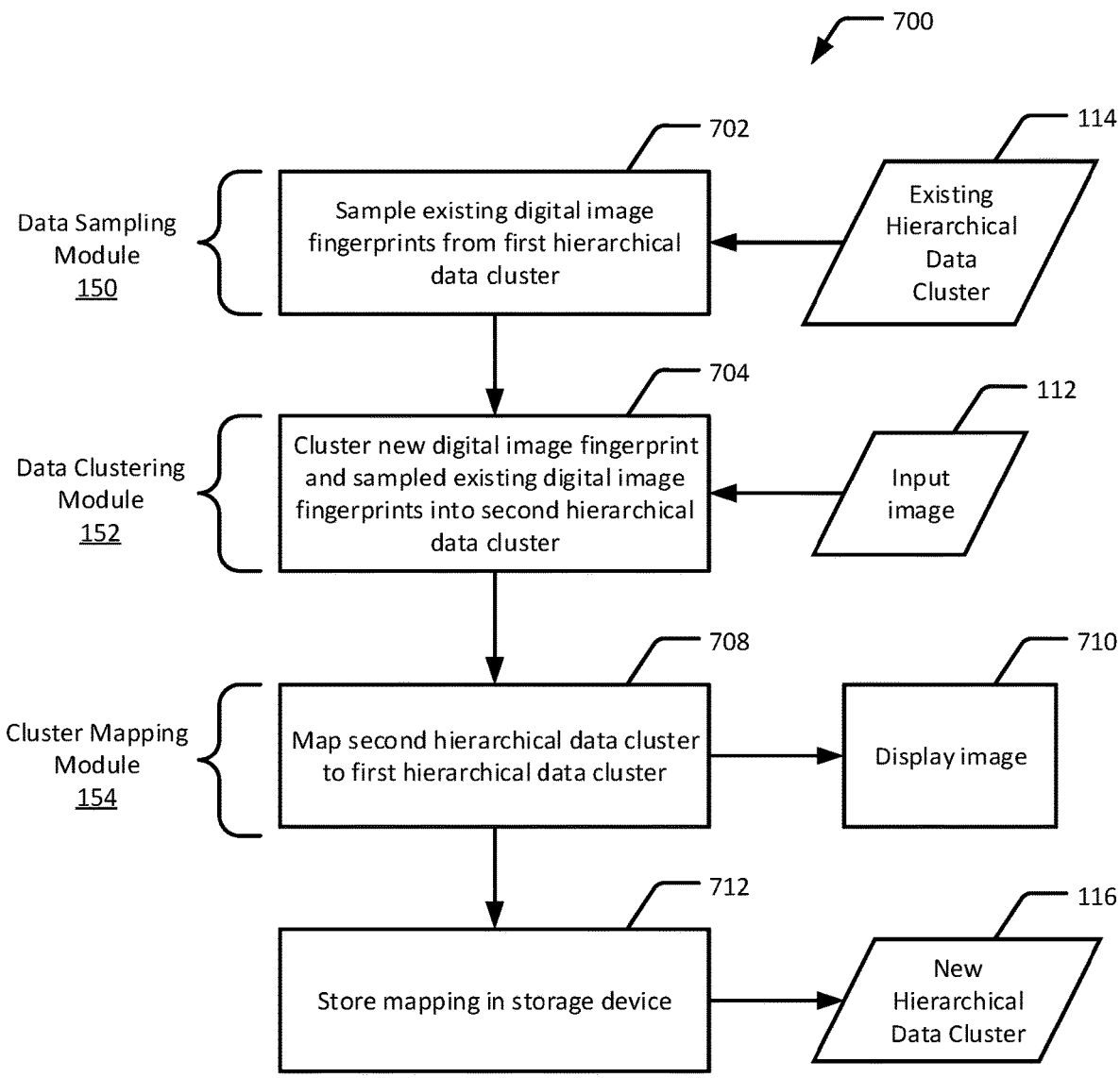
FIG. 7 is yet another example flow diagram of a method of incremental agglomerative clustering of data, in accordance with an embodiment.

FIG. 7 is another example flow diagram of a method 700 of incremental agglomerative clustering of data, in accordance with an embodiment. The method 700 can be implemented, for example, in the Agglomerative Clustering Application 140 of FIG. 1 and performed by the system 100. The method 700 includes sampling 702 fewer than all existing digital image fingerprints from a first hierarchical data cluster 114 of digital image fingerprints stored in a data storage device. The sampling 702 can be implemented, for example, in the Data Sampling Module 150 of FIG. 1 and performed by the system 100. The first hierarchical data cluster 114 excludes a new digital image fingerprint. In other words, the first hierarchical data cluster includes digital image fingerprints that have previously been clustered (and thus are considered existing), but not any digital image fingerprints that have not yet been clustered. In this embodiment, fewer than all existing digital image fingerprints are sampled. For example, a sample of 20 digital image fingerprints are sampled from a much larger set of fingerprints, on the order of approximately one sample for every 25 or more fingerprints or other data points in the first hierarchical data cluster.

In some embodiments, the method 700 includes receiving the new digital image and computing the new digital image fingerprint based on the new digital image if the fingerprint is not available. The method 700 further includes clustering 704 the new digital image fingerprint and each of the existing digital image fingerprints sampled from the first hierarchical data cluster to produce a second hierarchical data cluster of digital image fingerprints, the second hierarchical data cluster including the new digital image fingerprint. The clustering 704 can be implemented, for example, in the Data Clustering Module 152 of FIG. 1 and performed by the system 100. Various clustering techniques can be used, including HAC techniques. Notably, in this embodiment, only the new digital image fingerprint and the existing digital image fingerprints that were sampled from the first hierarchical data cluster are clustered. In other words, because the sample size is less than the total number of existing data points, not all existing digital image fingerprints in the first hierarchical data cluster are re-clustered. This facilitates an improvement in speed and efficiency when the new digital image fingerprint is added to the existing data clusters. In some embodiments, the clustering 604 includes determining a similarity between each of the existing digital image fingerprints sampled from the hierarchical data cluster and the new digital image fingerprint using a distance function. For example, the degree of similarity determines whether two or more digital images of a person's face or two or more digital image fingerprints are sufficiently likely to include images of the face of the same person.

The method 700 further includes mapping 708 the second hierarchical data cluster to the first hierarchical data cluster based on the determination. The mapping 708 can be implemented, for example, in the Cluster Mapping Module 154 of FIG. 1 and performed by the system 100. For example, the second hierarchical data cluster is mapped to the first hierarchical data cluster. In some cases, the mapping is performed when a majority of the existing digital image fingerprints in the first hierarchical data cluster match the new digital image fingerprint. Otherwise, the mapping is not performed. Instead, the second hierarchical data cluster is added to the overall set of data clusters as a new cluster.

In some embodiments, the first hierarchical data cluster includes a plurality of different hierarchical data clusters. For example, as described with respect to FIGS. 3 and 4, one data cluster may include digital image data and/or digital image fingerprint data for Person A and another data cluster may include digital image data and/or digital image fingerprint data for Person B. In such embodiments, the method 700 includes determining that a majority of the existing digital image fingerprints in the first hierarchical data cluster match the new digital image fingerprint includes determining which one of the different hierarchical data clusters includes the majority of the existing digital image fingerprints that match the new digital image fingerprint (such as described with respect to FIG. 6). The mapping 708 in such embodiments includes mapping the second hierarchical data cluster to the one of the different hierarchical data clusters that includes the majority of the existing digital image fingerprints that match the new digital image fingerprint. For example, referring to FIG. 4, there are two such mappings: one mapping between clusters FB (second) and AB (first), and another mapping between clusters CEG (second) and CDE (first).

The method 700 further includes storing 712 the mapping in the data storage device. For example, the mappings shown in FIG. 4 can be stored along with the data cluster set for future retrieval and use. In some embodiments, the method 700 further includes comprising storing the second hierarchical data cluster in the data storage device.

In some embodiments, the method 700 includes displaying 710, via a display device, at least one digital image corresponding to one of the existing digital image fingerprints in the first hierarchical data cluster in response to the mapping. For example, once the new input image 112 has been clustered and mapped, the image 112 can be displayed to a user. Other images associated with the cluster(s) mapped to the input image 112 can also be displayed to the user, such as images A, B, C, D, E, F, and/or G as shown in FIG. 2.

In some embodiments, the method 700 includes determining a first group identification value associated with the first hierarchical data cluster of digital image fingerprints and a second group identification value associated with the second hierarchical data cluster of digital image fingerprints. In this context, a group identification value is a value that uniquely identifies the respective data cluster. Thus, two data clusters containing different data will have two or more unique identification values. In such embodiments, the determining that a majority of the existing digital image fingerprints in the first hierarchical data cluster match the new digital image fingerprint includes determining that the first group identification value matches the second group identification value.

Figure 8:
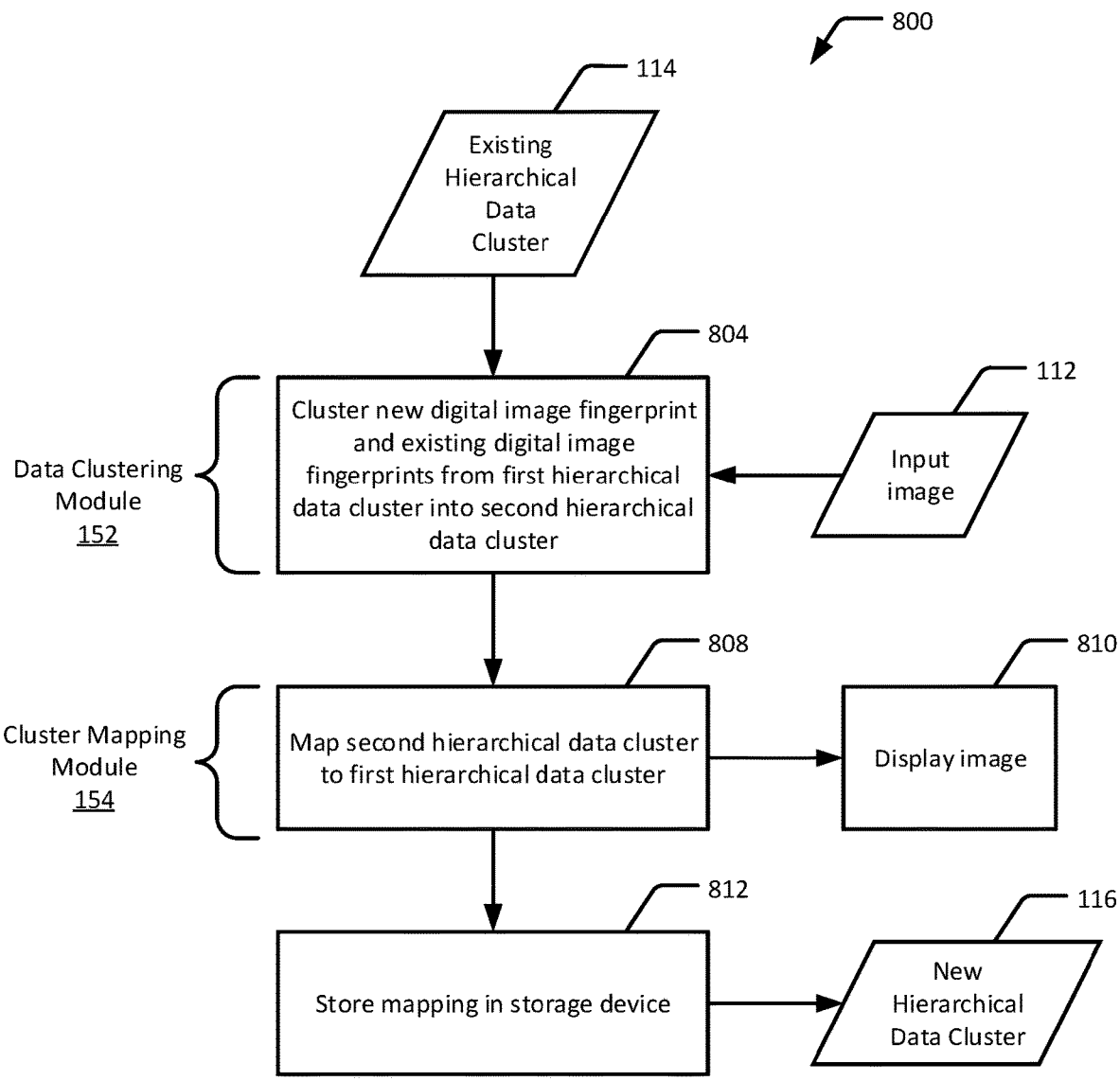
FIG. 8 is yet another example flow diagram of a method of incremental agglomerative clustering of data, in accordance with an embodiment.

FIG. 8 is another example flow diagram of a method 800 of incremental agglomerative clustering of data, in accordance with an embodiment. The method 800 can be implemented, for example, in the Agglomerative Clustering Application 140 of FIG. 1 and performed by the system 100. The method 800 includes clustering 804 a new digital image fingerprint and existing digital image fingerprints sampled from the first hierarchical data cluster to produce a second hierarchical data cluster of digital image fingerprints, the second hierarchical data cluster including the new digital image fingerprint. The clustering 804 can be implemented, for example, in the Data Clustering Module 152 of FIG. 1 and performed by the system 100. Various clustering techniques can be used, including HAC techniques. In this embodiment, only the new digital image fingerprint and existing digital image fingerprints that are sampled from the first hierarchical data cluster are clustered. The sample size can, in some cases, be less than the total number of existing data points, thus not all existing digital image fingerprints in the first hierarchical data cluster are necessarily re-clustered. This facilitates an improvement in speed and efficiency when the new digital image fingerprint is added to the existing data clusters. In some embodiments, the clustering 804 includes determining a similarity between each of the existing digital image fingerprints sampled from the hierarchical data cluster and the new digital image fingerprint using a distance function. For example, the degree of similarity determines whether two or more digital images of a person's face or two or more digital image fingerprints are sufficiently likely to include images of the face of the same person.

The method 800 further includes mapping 808 the second hierarchical data cluster to the first hierarchical data cluster based on the determination. The mapping 808 can each be implemented, for example, in the Cluster Mapping Module 154 of FIG. 1 and performed by the system 100. For example, the second hierarchical data cluster is mapped to the first hierarchical data cluster. In some cases, the second hierarchical data cluster is mapped to the first hierarchical data cluster only if a majority of the existing digital image fingerprints in the first hierarchical data cluster match the new digital image fingerprint. Otherwise, the mapping is not performed. Instead, the second hierarchical data cluster is added to the overall set of data clusters as a new cluster.

In some embodiments, the first hierarchical data cluster includes a plurality of different hierarchical data clusters. For example, as described with respect to FIGS. 3 and 4, one data cluster may include digital image data and/or digital image fingerprint data for Person A and another data cluster may include digital image data and/or digital image fingerprint data for Person B. In such embodiments, the determining 606 that a majority of the existing digital image fingerprints in the first hierarchical data cluster match the new digital image fingerprint includes determining which one of the different hierarchical data clusters includes the majority of the existing digital image fingerprints that match the new digital image fingerprint. The mapping 608 in such embodiments includes mapping the second hierarchical data cluster to the one of the different hierarchical data clusters that includes the majority of the existing digital image fingerprints that match the new digital image fingerprint. For example, referring to FIG. 4, there are two such mappings: one mapping between clusters FB (second) and AB (first), and another mapping between clusters CEG (second) and CDE (first).

The method 800 further includes storing 812 the mapping in the data storage device. For example, the mappings shown in FIG. 4 can be stored along with the data cluster set for future retrieval and use. In some embodiments, the method 800 further includes comprising storing the second hierarchical data cluster in the data storage device.

In some embodiments, the method 800 includes displaying 810, via a display device, at least one digital image corresponding to one of the existing digital image fingerprints in the first hierarchical data cluster in response to the mapping. For example, once the new input image 112 has been clustered and mapped, the image 112 can be displayed to a user. Other images associated with the cluster(s) mapped to the input image 112 can also be displayed to the user, such as images A, B, C, D, E, F, and/or G as shown in FIG. 2.

In some embodiments, the method 800 includes determining a first group identification value associated with the first hierarchical data cluster of digital image fingerprints and a second group identification value associated with the second hierarchical data cluster of digital image fingerprints. In this context, a group identification value is a value that uniquely identifies the respective data cluster. Thus, two data clusters containing different data will have two or more unique identification values. In such embodiments, the determining that a majority of the existing digital image fingerprints in the first hierarchical data cluster match the new digital image fingerprint includes determining that the first group identification value matches the second group identification value.

Numerous embodiments will be apparent in light of the present disclosure, and features described herein can be combined in any number of configurations. One example embodiment provides, in a digital medium environment for processing digital images, a computer-implemented method of incremental agglomerative clustering of data. The method includes sampling, by at least one processor, fewer than all of a plurality of existing digital image fingerprints from a first hierarchical data cluster of digital image fingerprints stored in a data storage device, the first hierarchical data cluster excluding a new digital image fingerprint. The method further includes clustering, by the at least one processor, the new digital image fingerprint and the existing digital image fingerprints sampled from the first hierarchical data cluster to produce a second hierarchical data cluster of digital image fingerprints, the second hierarchical data cluster including the new digital image fingerprint. The method further includes determining, by the at least one processor, that a majority of the existing digital image fingerprints in the first hierarchical data cluster match the new digital image fingerprint. The method further includes mapping, by the at least one processor, the second hierarchical data cluster to the first hierarchical data cluster based on the determination. The method further includes storing a representation of the mapping in the data storage device. In some cases, the method includes storing, by the least one processor, the second hierarchical data cluster in the data storage device. In some cases, the first hierarchical data cluster includes a plurality of different hierarchical data clusters, the determining includes determining which one of the different hierarchical data clusters includes the majority of the existing digital image fingerprints that match the new digital image fingerprint, and the mapping includes mapping the second hierarchical data cluster to the one of the different hierarchical data clusters including the majority of the existing digital image fingerprints that match the new digital image fingerprint. In some cases, the method includes receiving, by the at least one processor, the new digital image and computing, by the at least one processor, the new digital image fingerprint based on the new digital image. In some cases, the method includes causing, by the at least one processor, display of at least one digital image corresponding to one of the existing digital image fingerprints in the first hierarchical data cluster in response to the mapping. In some cases, the clustering includes determining a similarity between each of the existing digital image fingerprints sampled from the hierarchical data cluster and the new digital image fingerprint using a distance function, and the determining that an existing digital image fingerprint in the first hierarchical data cluster matches the new digital image fingerprint is based on that existing digital image fingerprint being within a threshold distance of the new digital image fingerprint, according to the distance function. In some cases, the method includes determining a first group identification value associated with the first hierarchical data cluster of digital image fingerprints and a second group identification value associated with the second hierarchical data cluster of digital image fingerprints, and the determining includes determining that the first group identification value matches the second group identification value. Another example embodiment provides a computer program product including one or more non-transitory machine-readable media having instructions encoded thereon that when executed by one or more processors cause the one or more computer processors to perform a process such as set forth in this paragraph.

Another example embodiment provides a system for incremental agglomerative clustering of digital image data. The system includes at least one processor and a storage operatively coupled to the at least one processor and for storing instructions that when executed by the at least one processor cause the at least one processor to carry out a process for incremental agglomerative clustering of digital image data. The process includes sampling fewer than all of a plurality of existing digital image fingerprints from a first hierarchical data cluster of digital image fingerprints stored in a data storage device, the first hierarchical data cluster excluding a new digital image fingerprint. The process further includes clustering the new digital image fingerprint and the existing digital image fingerprints sampled from the first hierarchical data cluster to produce a second hierarchical data cluster of digital image fingerprints, the second hierarchical data cluster including the new digital image fingerprint. The process further includes determining that a majority of the existing digital image fingerprints in the first hierarchical data cluster match the new digital image fingerprint. The process further includes mapping the second hierarchical data cluster to the first hierarchical data cluster based on the determination. The process further includes storing the mapping in the data storage device. In some cases, the process includes storing, by the least one processor, the second hierarchical data cluster in the data storage device. In some cases, the first hierarchical data cluster includes a plurality of different hierarchical data clusters, the determining includes determining which one of the different hierarchical data clusters includes the majority of the existing digital image fingerprints that match the new digital image fingerprint, and the mapping includes mapping the second hierarchical data cluster to the one of the different hierarchical data clusters including the majority of the existing digital image fingerprints that match the new digital image fingerprint. In some cases, the process includes receiving, by the at least one processor, the new digital image and computing, by the at least one processor, the new digital image fingerprint based on the new digital image. In some cases, the process includes causing, by the at least one processor, display of at least one digital image corresponding to one of the existing digital image fingerprints in the first hierarchical data cluster in response to the mapping. In some cases, the clustering includes determining a similarity between each of the existing digital image fingerprints sampled from the hierarchical data cluster and the new digital image fingerprint using a distance function, and the determining that an existing digital image fingerprint in the first hierarchical data cluster matches the new digital image fingerprint is based on that existing digital image fingerprint being within a threshold distance of the new digital image fingerprint, according to the distance function. In some cases, the process includes determining a first group identification value associated with the first hierarchical data cluster of digital image fingerprints and a second group identification value associated with the second hierarchical data cluster of digital image fingerprints, and the determining includes determining that the first group identification value matches the second group identification value.

The foregoing description and drawings of various embodiments are presented by way of example only. These examples are not intended to be exhaustive or to limit the invention to the precise forms disclosed. Alterations, modifications, and variations will be apparent in light of this disclosure and are intended to be within the scope of the invention as set forth in the claims.

What is claimed is:

1. In a digital medium environment for processing digital images, a computer-implemented method of incremental agglomerative clustering of data, the method comprising:
sampling, by at least one processor, fewer than all of a plurality of existing digital image fingerprints from a first hierarchical data cluster of digital image fingerprints stored in a data storage device, the first hierarchical data cluster excluding a new digital image fingerprint;
clustering, by the at least one processor, the new digital image fingerprint and the existing digital image fingerprints sampled from the first hierarchical data cluster to produce a second hierarchical data cluster of digital image fingerprints, the second hierarchical data cluster including the new digital image fingerprint;
determining, by the at least one processor, that a majority of the existing digital image fingerprints in the first hierarchical data cluster match the new digital image fingerprint; mapping, by the at least one processor, the second hierarchical data cluster to the first hierarchical data cluster based on the determination, wherein the first hierarchical data cluster includes a plurality of different hierarchical data clusters, wherein the determining includes determining which one of the different hierarchical data clusters includes the majority of the existing digital image fingerprints that match the new digital image fingerprint, and wherein the mapping includes mapping the second hierarchical data cluster to the one of the different hierarchical data clusters including the majority of the existing digital image fingerprints that match the new digital image fingerprint; and
storing a representation of the mapping in the data storage device.

2. The method of claim 1, further comprising storing, by the least one processor, the second hierarchical data cluster in the data storage device.

3. The method of claim 1, further comprising receiving, by the at least one processor, the new digital image and computing, by the at least one processor, the new digital image fingerprint based on the new digital image.

4. The method of claim 1, further comprising causing, by the at least one processor, display of at least one digital image corresponding to one of the existing digital image fingerprints in the first hierarchical data cluster in response to the mapping.

5. The method of claim 1, wherein the clustering includes determining a similarity between each of the existing digital image fingerprints sampled from the hierarchical data cluster and the new digital image fingerprint using a distance function, and the determining that an existing digital image fingerprint in the first hierarchical data cluster matches the new digital image fingerprint is based on that existing digital image fingerprint being within a threshold distance of the new digital image fingerprint, according to the distance function.

6. The method of claim 1, further comprising determining a first group identification value associated with the first hierarchical data cluster of digital image fingerprints and a second group identification value associated with the second hierarchical data cluster of digital image fingerprints, wherein the determining includes determining that the first group identification value matches the second group identification value.

7. A computer program product including one or more non-transitory machine-readable media having instructions encoded thereon that when executed by at least one processor causes a process to be carried out for incremental agglomerative clustering of digital image data, the process comprising:
   sampling, by the at least one processor, fewer than all of a plurality of existing digital image fingerprints from a first hierarchical data cluster of digital image fingerprints stored in a data storage device, the first hierarchical data cluster excluding a new digital image fingerprint;
   clustering, by the at least one processor, the new digital image fingerprint and the existing digital image fingerprints sampled from the first hierarchical data cluster to produce a second hierarchical data cluster of digital image fingerprints, the second hierarchical data cluster including the new digital image fingerprint;
   mapping, by the at least one processor, the second hierarchical data cluster to the first hierarchical data cluster;
   determining, by the at least one processor, that a majority of the existing digital image fingerprints in the first hierarchical data cluster match the new digital image fingerprint, wherein the first hierarchical data cluster includes a plurality of different hierarchical data clusters, wherein the determining includes determining which one of the different hierarchical data clusters includes the majority of the existing digital image fingerprints that match the new digital image fingerprint, and wherein the mapping includes mapping the second hierarchical data cluster to the one of the different hierarchical data clusters including the majority of the existing digital image fingerprints that match the new digital image fingerprint; and
   storing the mapping in the data storage device.

8. The computer program product of claim 7, wherein the process further comprises storing, by the least one processor, the second hierarchical data cluster in the data storage device.

9. The computer program product of claim 7, wherein the process further comprises receiving, by the at least one processor, the new digital image and computing, by the at least one processor, the new digital image fingerprint based on the new digital image.

10. The computer program product of claim 7, wherein the process further comprises causing at least one digital image corresponding to one of the existing digital image fingerprints in the first hierarchical data cluster to be displayed in response to the mapping.

11. The computer program product of claim 7, wherein the clustering includes determining a similarity between each of the existing digital image fingerprints sampled from the hierarchical data cluster and the new digital image fingerprint using a distance function, and the determining that an existing digital image fingerprint in the first hierarchical data cluster matches the new digital image fingerprint is based on that existing digital image fingerprint being within a threshold distance of the new digital image fingerprint, according to the distance function.

12. The computer program product of claim 7, further comprising determining a first group identification value associated with the first hierarchical data cluster of digital image fingerprints and a second group identification value associated with the second hierarchical data cluster of digital image fingerprints, wherein the determining includes determining that the first group identification value matches the second group identification value.

13. A system for incremental agglomerative clustering of digital image data, the system comprising:
   at least one processor; and
   a storage operatively coupled to the at least one processor and for storing instructions that when executed by the at least one processor cause the at least one processor to carry out a process for incremental agglomerative clustering of digital image data, the process comprising:
      clustering a new digital image fingerprint and fewer than all of a plurality of existing digital image fingerprints in a first hierarchical data cluster to produce a second hierarchical data cluster of digital image fingerprints, the first hierarchical data cluster excluding a new digital image fingerprint and the second hierarchical data cluster including the new digital image fingerprint;
      mapping the second hierarchical data cluster to the first hierarchical data cluster;
      determining that a majority of the existing digital image fingerprints in the first hierarchical data cluster match the new digital image fingerprint, wherein the mapping includes mapping the second hierarchical data cluster to the first hierarchical data cluster including the majority of the existing digital image fingerprints that match the new digital image fingerprint,
      wherein the first hierarchical data cluster includes a plurality of different hierarchical data clusters, wherein the determining includes determining which one of the different hierarchical data clusters includes the majority of the existing digital image fingerprints that match the new digital image fingerprint, wherein the mapping includes mapping the second hierarchical data cluster to the one of the different hierarchical data clusters including the majority of the existing digital image fingerprints that match the new digital image fingerprint; and
      storing the mapping in a data storage device.

14. The system of claim 13, wherein the process further comprises:
   determining that a majority of the existing digital image fingerprints in the first hierarchical data cluster match the new digital image fingerprint, wherein the mapping includes mapping the second hierarchical data cluster to the first hierarchical data cluster including the majority of the existing digital image fingerprints that match the new digital image fingerprint.

15. The system of claim 13, wherein the process further comprises receiving, by the at least one processor, the new digital image and computing, by the at least one processor, the new digital image fingerprint based on the new digital image.

16. The system of claim 13, wherein the clustering includes determining a similarity between each of the existing digital image fingerprints sampled from the hierarchical data cluster and the new digital image fingerprint using a distance function, and the determining that an existing digital image fingerprint in the first hierarchical data cluster matches the new digital image fingerprint is based on that existing digital image fingerprint being within a threshold distance of the new digital image fingerprint, according to the distance function.

17. The system of claim 13, wherein the process further comprises determining a first group identification value associated with the first hierarchical data cluster of digital image fingerprints and a second group identification value associated with the second hierarchical data cluster of digital image fingerprints, wherein the determining includes determining that the first group identification value matches the second group identification value.

\* \* \* \* \*